United States Patent [19]
Sezan et al.

[11] Patent Number: 5,521,644
[45] Date of Patent: May 28, 1996

[54] MECHANISM FOR CONTROLLABLY DEINTERLACING SEQUENTIAL LINES OF VIDEO DATA FIELD BASED UPON PIXEL SIGNALS ASSOCIATED WITH FOUR SUCCESSIVE INTERLACED VIDEO FIELDS

[75] Inventors: M. Ibrahim Sezan; Andrew J. Patti, both of Rochester, N.Y.

[73] Assignee: Eastman Kodak Company, Rochester, N.Y.

[21] Appl. No.: 268,363

[22] Filed: Jun. 30, 1994

[51] Int. Cl.$^6$ .................................................. H04N 7/01
[52] U.S. Cl. ............................................. 348/452; 348/448
[58] Field of Search ....................................... 348/447, 448, 348/452, 458, 699, 700, 701; H04N 7/01

[56] References Cited

U.S. PATENT DOCUMENTS

| | | | |
|---|---|---|---|
| 5,260,786 | 11/1993 | Kawashima et al. | 348/452 |
| 5,410,356 | 4/1995 | Kikuchi et al. | 348/452 |

Primary Examiner—Victor R. Kostak
Assistant Examiner—John W. Miller
Attorney, Agent, or Firm—Peyton C. Watkins

[57] ABSTRACT

A hybrid deinterlace mechanism employs motion detection as a precursor to select the value for each missing pixel of a deinterlaced frame, which is generated by using four consecutive fields to produce a motion detection map that is subsequently coupled to a deinterlacer, together with a selected two of the four consecutive fields. These two selected fields and the motion map are sufficient for the deinterlacer to completely characterize the resulting deinterlaced frame. The deinterlacer switches between vertical interpolation and merging based upon motion. Motion is detected by applying a logic OR operation to respective even and odd field binary motion detection signals. In the absence of motion, the pixel values of an odd field and its immediately succeeding even field are merged. On the other hand, if motion is detected, vertical interpolation is carried out for the even field, by a linear combination of immediately adjacent pixels, respectively above and below the pixel of interest.

31 Claims, 9 Drawing Sheets

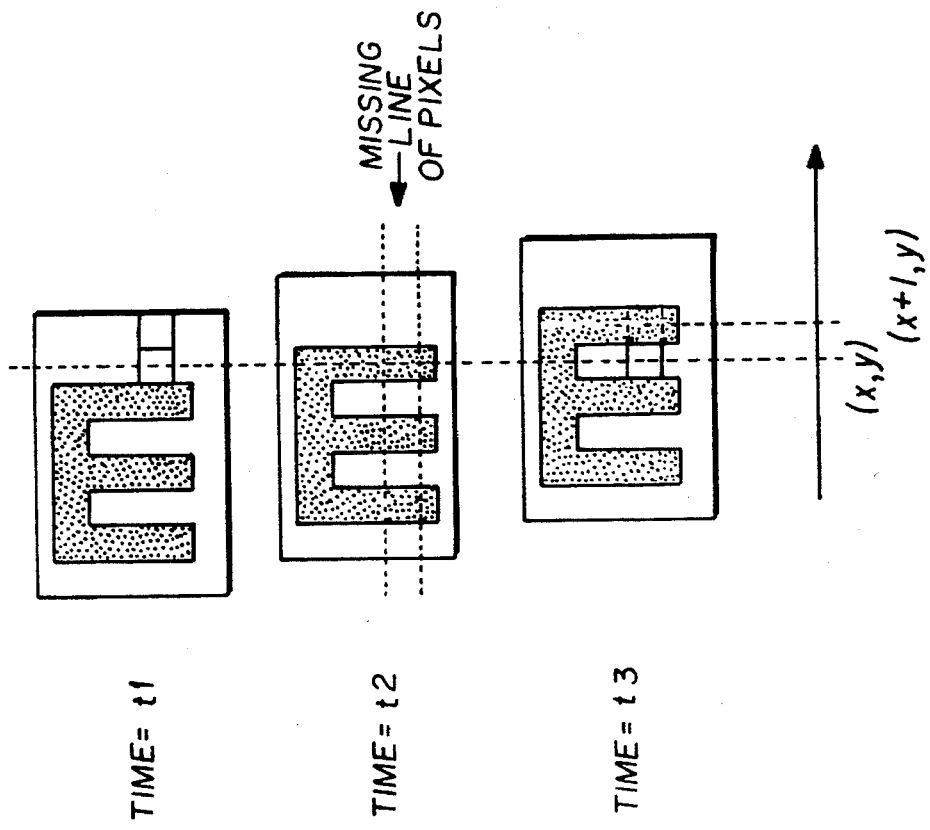
FIG. 3 *PRIOR ART*
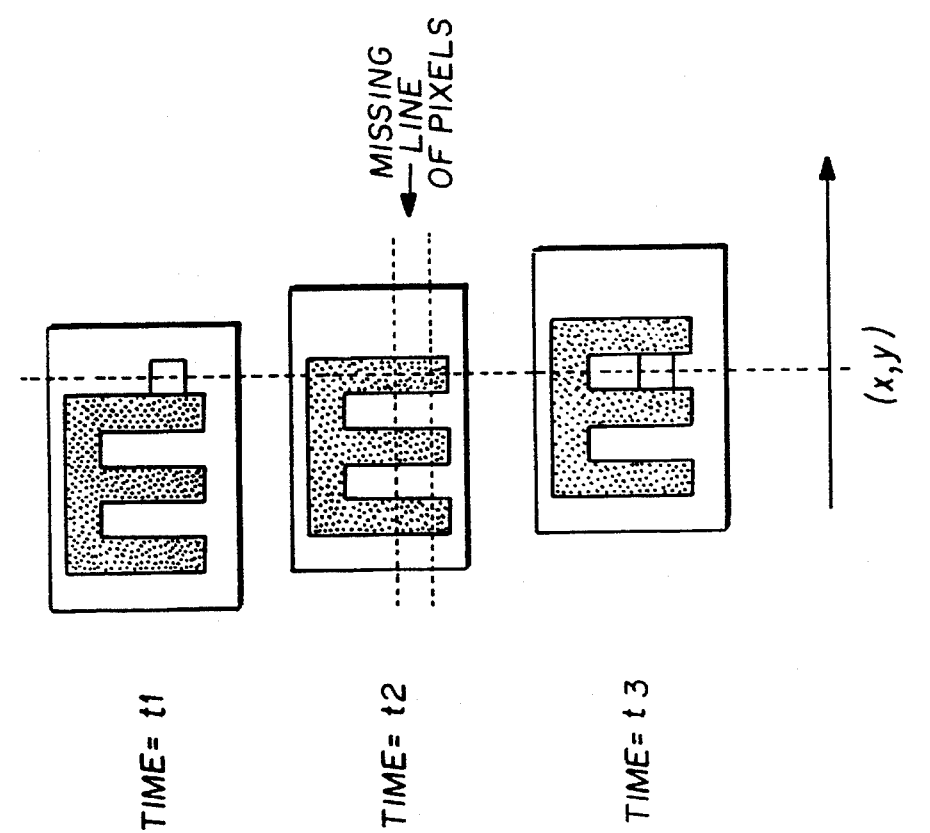
FIG. 2 *PRIOR ART*

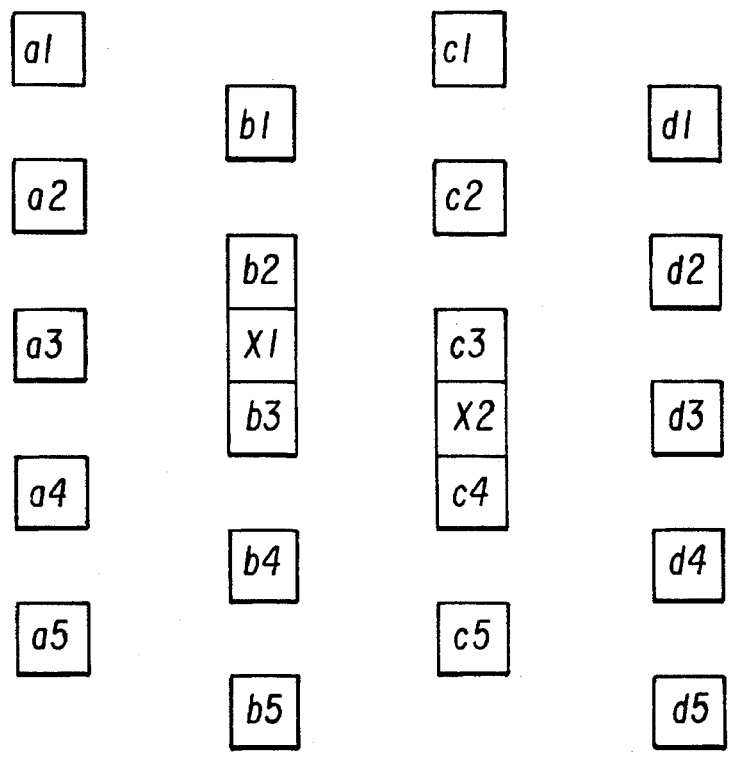
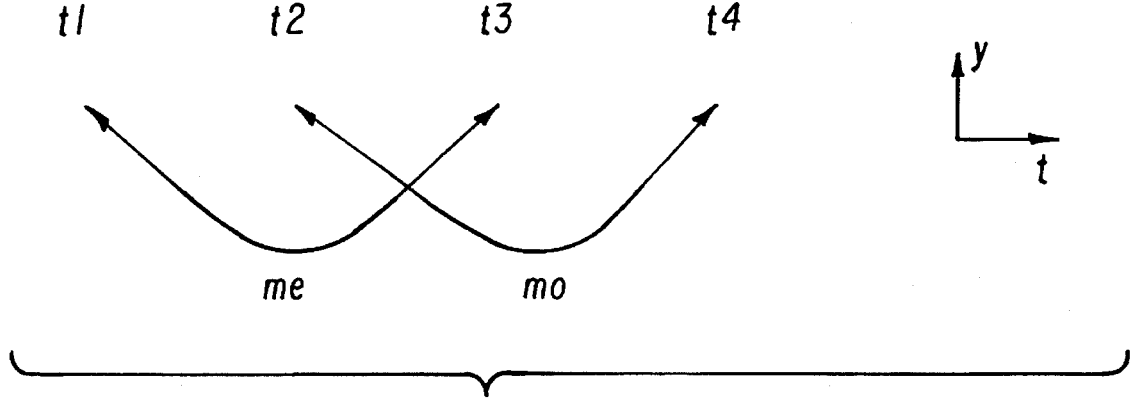
FIG. 5
PRIOR ART

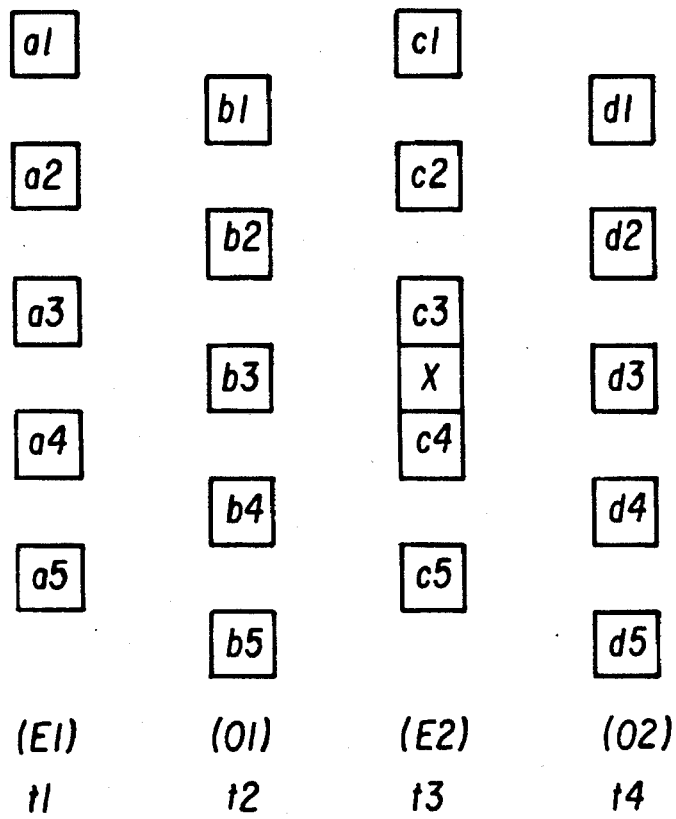
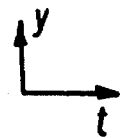
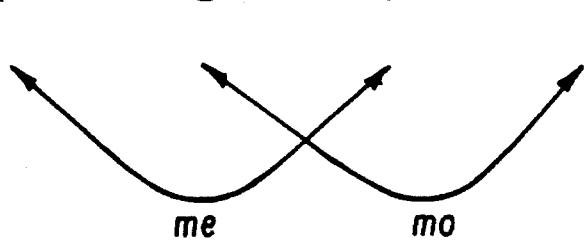
$md = (me) V (mo)$
$X = b3$ if $md = 0$ (no motion) (merging)
$X = 1/2 (c3+c4)$ if $md = 1$ (motion) (vertical interpolation)
FIG. 7

FIG. 8

| c1 | c2 | c3 | c4 | c5 | c6 |
|----|----|----|----|----|----|
| c7 | c8 | c9 | c10 | c11 | c12 |
| c13 | c14 | c15 | c16 | c17 | c18 |

| c19 | c20 | c21 | c22 | c23 | c24 |
|-----|-----|-----|-----|-----|-----|
| c7 | c8 | c9 | c10 | c11 | c12 |
| c13 | c14 | c15 | c16 | c17 | c18 |

| c19 | c20 | c21 | c22 | c23 | c24 |
|-----|-----|-----|-----|-----|-----|
| c25 | c26 | c27 | c28 | c29 | c30 |
| c13 | c14 | c15 | c16 | c17 | c18 |

|  |  |  |  |  |  |
|---|---|---|---|---|---|
| d1 | d2 | d3 | d4 | d5 | d6 |
| d7 | d8 | d9 | d10 | d11 | d12 |
| d13 | d14 | d15 | d16 | d17 | d18 |

|  |  |  |  |  |  |
|---|---|---|---|---|---|
| d19 | d20 | d21 | d22 | d23 | d24 |
| d7 | d8 | d9 | d10 | d11 | d12 |
| d13 | d14 | d15 | d16 | d17 | d18 |

|  |  |  |  |  |  |
|---|---|---|---|---|---|
| d19 | d20 | d21 | d22 | d23 | d24 |
| d25 | d26 | d27 | d28 | d29 | d30 |
| d13 | d14 | d15 | d16 | d17 | d18 |

MECHANISM FOR CONTROLLABLY DEINTERLACING SEQUENTIAL LINES OF VIDEO DATA FIELD BASED UPON PIXEL SIGNALS ASSOCIATED WITH FOUR SUCCESSIVE INTERLACED VIDEO FIELDS

FIELD OF THE INVENTION.

The present invention relates in general to an image signal processing technique for converting interlaced video signals into progressive or sequential signal format, and is particularly directed to a multiple interlaced image field processing mechanism, that is operative to generate pixel signals within each of sequential lines of a deinterlaced video data field associated with a prescribed field polarity, by selectively merging pixels from an immediately adjacent image field or performing interpolation among pixels of the field of interest, in dependence upon a determination of the presence or absence of image motion between a first pair of image fields of a first polarity and a second pair of image fields of an opposite polarity, wherein one of the fields of the two pairs is the image field of interest.

BACKGROUND OF THE INVENTION

In order to display interlaced video signals on a progressive or sequential line display with high visual quality, it is necessary to 'deinterlace' interlaced odd and even fields of video signals into a sequentially continuous field of pixels without (interline) gaps. In addition, deinterlacing, prior to printing, results in higher quality still pictures from video.

In an interlaced video frame, each frame of pixels is composed of two time sequential fields—an even field and an odd field. Compared to a full frame of successive lines without missing lines of pixels, each (odd or even) field is subsampled by a factor of two in the vertical dimension, so that, as diagrammatically illustrated in FIG. 1, an even field contains data at only even-numbered line locations (e.g. lines 0, 2, 4, 6, and 8), and an odd field contains data at only odd-numbered line locations (e.g. lines 1, 3, 5, 7,). Thus, an even field has no pixel values for odd numbered lines of the full frame, and an odd field has no pixel values for even numbered line of the full frame.

In order to deinterlace an even (or an odd) field into a full frame without missing lines of pixels, it is necessary to estimate the missing odd (or even) lines. One well-known method for this purpose involves merging the even and odd fields together, namely simply filling in the missing lines of the odd (even) field with the lines of the immediately adjacent even (odd) field. Unfortunately, such an approach introduces "jitter" artifacts at portions of the image containing moving objects (i.e. objects that move within the time interval of two successive fields). On the other hand, merging provides optimal spatial resolution at steady image regions (namely at those pixel locations where the image does not change between successive fields).

Another approach is to concentrate on a single field only (i.e., the odd field) and interpolate the missing lines using spatial interpolation. One example of a relatively simple spatial interpolation technique involves bilinear interpolation, in which an average of the available pixel values in lines immediately above and below the pixel of interest in the missing line is assigned to the missing pixel. However, this method may cause artifacts if the missing pixel is over an edge whose orientation is not vertical.

To overcome these artifacts, an edge-adaptive spatial interpolation method, described in the U.S. Patent to Dougall et al., U.S. Pat. No. 5,019,903, entitled "Spatial Interpolation Between Lines Of A Supersampled Digital Video Signal In Accordance With A Gradient Vector Selected For Maximum Matching Of Blocks Of Samples Which Are Offset In Opposite Directions," has been proposed. The patented technique first attempts to determine the orientation of the image gradient at the missing pixel, and then interpolation is performed using image values that are located along this determined orientation, in order not to "cross an edge" and cause unwanted artifacts.

The Dougall et al. patent proposes that a potentially more effective method would be to use a hybrid scheme, where the deinterlacing process would switch, on a pixel-by-pixel basis, between merging and (edge-adaptive) spatial interpolation, depending on the dynamics of the image at the locations of the missing pixels, so that the reduced complexity advantages of using merging in steady regions of the image would be maintained.

In order to classify the dynamics of each pixel as either a "moving pixel" or "steady pixel," it would be necessary to employ a motion detection scheme as a precursor to choosing merging or interpolation. However, the Dougall et al patent offers no discussion as to how to implement such a mechanism.

In order to detect motion in an image, the contents of successive image fields of opposite polarity (even-odd or odd-even) can be compared with one another. However, the accuracy of motion detection can be increased significantly when two consecutive fields of the same polarity (i.e., an immediately preceding even (odd) field (i−1) and an immediately succeeding even (odd) field (i+1)), between which an odd (even) field (i) occurs, are utilized for motion detection.

The U.S. patent to Bennett et al., U.S. Pat. No. 4,472,732 describes a method which employs the pixel-to-pixel difference of neighboring fields with the same polarity (e.g. even fields) that immediately follow and precede the field to be deinterlaced (e.g. an odd field), in order to perform motion detection. The method then switches between merging and vertical interpolation depending upon the presence and absence of motion that is determined by thresholding the difference values.

Unfortunately, the use of single-pixel differences may falsely detect 'no motion' if the scene is such that the gray levels of the pixels being compared in the two neighboring fields are similar, even though there is motion in the scene. Such a situation may occur, for instance, in the case of scenes that contain a moving structure with text on it.

An example of this circumstance is illustrated in FIG. 2, which diagrammatically depicts what is essentially a black letter 'E' rotated clockwise by 90° and situated against a white background. For this illustrated image, a 'no motion' decision is rendered at the (missing) pixel location (x,y) in the field at time t2, by differencing co-located values at fields at times t1 and t3, although there is motion at that pixel location. In this case, merging the fields am times t1 and t2 at pixel location (x,y) will result in artifacts due to this false classification.

The occurrence of such false classifications may be reduced by differencing and thresholding an N1×N2 block of pixels (e.g. N1=N2=3) rather than a single pixel. The benefits of using a 1×2 block (i.e. N1=1, N2=2), for instance, and thresholding the difference $(\frac{1}{2})(|f(x,y, t1)-f(x,y, t3)|+|f(x+1,y, t1) -f(x+1,y, t3)|)$ to detect whether or not the missing pixel $f(x,y, t2)$ belongs to a moving region may be seen in FIG. 3, where f(.,.,.) denotes the spatiotemporal distribution of the fields.

If, as shown at time t4 in FIG. 4, a further fourth field is used for motion detection, a comparison of the fields at times t2 and t4 (in addition to the comparison of the fields at times t1 and t3) may increase the reliability of motion detection. In the example of FIG. 4, a "moving" decision can be rendered for the pixel of interest in the frame at time t2 as a result of comparing the corresponding pixels (at spatial location (x,y+1)) at frames at times t2 and t4.

The U.S. patent to Ishikawa, U.S. Pat. No. 4,785,351 describes a deinterlacing scheme, as applied to a time sequence of interlaced fields, such as an interlaced TV video signal, where motion detection is based not only upon the pixel-to-pixel difference of immediate neighbors (e.g. fields at t2 and t4, shown in FIG. 5), but also on the basis of a motion detection signal that has been obtained previously for deinterlacing t2, using t1 and t3, so as to effectively employ four consecutive fields.

In the scheme detailed in the '351 patent, in an effort to reduce noise, an average of existing pixel values of the fields surrounding the field of interest is placed in the location of the missing pixel, rather than directly using the value of a neighboring pixel (e.g. merging). However, since the existing lines in the field of interest that are directly reproduced in the deinterlaced version of the image are not processed for noise reduction, the averaging process for missing pixels may introduce some undesirable artifacts in the resulting image frame. Although such artifacts may not be visible in TV viewing applications, where the resulting frames are displayed in motion, they may be objectionable when the resulting deinterlaced frames are reproduced as still images (for display or printing). For example, over a stationary region, the missing lines that are generated by temporal interpolation may appear less noisy than the adjacent unprocessed (existing) field lines, causing a visually disturbing effect, especially noticeable in printing applications.

The effect of the deinterlacing scheme described in the '351 patent is illustrated in FIG. 5. The patented mechanism employs a rolling memory system that is a cascade of two field stores and a line buffer, and makes the resulting deinterlaced frame available, on a pixel-by-pixel basis, to a display system, for example, in the case of a television platform performing interlaced to progressive scan conversion. In FIG. 5, as the field data (E2) at time t3 becomes available, motion detection is performed by taking the difference between values (E1) and (E2) from fields at times t1 and t3, respectively, e.g. the absolute difference $|a3-c3|$, and comparing the difference with a threshold in order to detect motion for missing pixel value denoted as X1.

The binary motion detection decision is reflected by appropriately setting the value of a motion detection signal me (e.g. me=1 if there is motion). Depending upon the value of me, vertical interpolation (e.g. $X1 = (\frac{1}{2})(b2+b3)$) or temporal interpolation (e.g. $X1 = (\frac{1}{2})(a3+c3)$) is performed to produce the values of the deinterlaced frame at time t2.

Next, when the field at time t3 is deinterlaced, the fields at times t2 and t4 are employed for motion detection, e.g., absolute difference $|b3-d3|$ is compared with a threshold to produce a binary motion detection signal mo. The motion detection signal for the missing pixel X2 is defined by logically ORing me and mo, i.e., $md = (me) V (mo)$. In other words, the previous motion detection signal is stored and used for the next frame. It should be noted that the system described in the '351 patent produces deinterlaced frames in a sequential manner. For example, in the case shown in FIG. 5, the Ishikawa system first produces a deinterlaced version of the odd field 01 and then a deinterlaced version of the even field E2.

Another four-field based motion detection approach is described in the U.S. patent to Motoe et al, U.S. Pat. No. 5,021,870, where the missing pixel of interest is set to a value that is equal to a linear combination of the result of temporal averaging of values belonging to the surrounding fields that have the same parity, and the result of vertical spatial interpolation performed using the existing pixel values of the field of interest. The motion detection signal determines the weights assigned to these two quantities in forming the linear combination. This method uses a rolling memory system formed of three pixel stores and supplies the values of the deinterlaced frame pixel by pixel to a display system. As in the above-referenced '351 patent, pixel-by-pixel differences are employed to generate a motion detection signal.

SUMMARY OF THE INVENTION

In accordance with the present invention, a single deinterlaced frame is generated by using four consecutive fields to produce a motion detection map that is subsequently coupled to a deinterlacer, together with a selected two of the four consecutive fields. These two selected fields and the motion map are sufficient for the deinterlacer to completely characterize the resulting deinterlaced frame.

In a preferred embodiment of the invention, rather than employ temporal averaging employed in the above-referenced '870 patent to Motoe et al, the deinterlacer switches between vertical interpolation and merging based upon motion. Motion is detected by applying a logic OR operation to respective even and odd field binary motion detection signals. In the absence of motion, the pixel values of an odd field and its immediately succeeding even field are merged. On the other hand, if motion is detected, vertical interpolation is carried out for the even field, by a linear combination of immediately adjacent pixels, respectively above and below the pixel of interest.

Merging or spatial interpolation is performed to estimate the values of the missing pixels, with one of the factors being the presence or absence of motion in the image at the locations of the missing pixels. Motion detection is performed for each one of the missing pixels, and the result is stored as a binary value in the respective storage locations of a motion detection map storage space. In generating the motion detection map a first binary value (e.g. a "1") is written to respective one of the storage locations of the motion detection storage space, if image motion is detected for the missing pixel location xi of interest. Conversely, a second binary value (e.g. a "0") is stored if there is no image motion for that missing pixel location.

The system of the invention employs odd and even field stores, which respectively store the contents of selected odd and even fields. The contents of the motion detection map store and the field stores are coupled to a deinterlacer. The deinterlacer produces a respective missing pixel. In a preferred embodiment of the invention, vertical bilinear interpolation is employed, using the average of the existing pixel values located immediately above and below the missing pixel.

Motion detection is performed in two steps. In the first step, the pixels of the same respective locations of the two even fields are compared with one another to form a first 'even' binary motion detection array. Likewise, in a second step, the pixels of the same respective locations of the two odd fields are compared with one another to form a second 'odd' binary motion detection array. A first even motion detection array is computed by comparing a sum signal, representative of the average of differences between values of respective ones of pixels of arrays of pixels which neighbor the corresponding pixel location in each of the first and second image fields, with a threshold T. If the sum signal exceeds the threshold value T, then it is concluded that there is effective relative image motion between the first and second image fields, and a first binary value (e.g. a "1") is written into storage location of the even field storage space. Otherwise, a second binary value (e.g. a "0") is written into the storage location, to indicate that there is no relative image motion at the location of the missing pixel of the even field.

Where the location of the missing pixel of a selected even field is at a border location of the image field, the size of the array of pixels employed to perform motion detection and pixel interpolation are reduced. For the first and last row, and the first and last column, the three-by-three comparison window may be downsized, for example to a two-by-two window and to a two-by-three window, respectively.

In addition to computing a motion detection map for an even field, a motion detection map is computed for a selected odd field, again on the basis of thresholding a block of (N×N) pixels. Once the two intermediate motion detection arrays for the odd and even field pairs have been derived, a final motion detection map is generated by logically ORing, point-by-point, the contents of the two motion detection arrays. The deinterlacer then proceeds to process the odd and even fields supplied by the upstream motion detection system.

When processing the successive image fields of the four field sequence, the respective pixel data values of a first even field are written into storage locations of an even field store, and the respective pixel data values of a first odd field are written into storage locations of an odd field store. For the third (even) field in the four field sequence, respective pixel values are sequentially written into an N-line auxiliary buffer.

In the course of loading the third field pixels into the auxiliary buffer, the buffer will eventually contain a sufficient number of pixel values to permit a binary motion value to be computed from its contents and those of the image store for the even field. When the buffer becomes full, a binary motion detection value is computed for a missing pixel location, and stored in the motion detection memory. This process is sequentially executed for successive pixels, computing successive binary values of the motion detection memory.

Once the last pixel value is loaded into the last line of the auxiliary buffer, further loading of the buffer cannot proceed unless accommodation is made for replacing already loaded buffer space with additional pixels of the image field. In accordance with the invention, respective lines of pixel values of the buffer are successively transferred into successive lines of the even field memory and written over the current pixel values of the replaced lines. As new pixel values are written into the buffer, binary motion detection values are computed and written into the motion detection memory.

Eventually, through successive repetitions of the above transfer and replacement operations between the auxiliary buffer and the even field memory, the even field memory will contain all the pixels of the field that have been transferred from the auxiliary buffer B, the odd field memory contains all the pixels of the odd field, and the motion detection memory contains motion array binary values for the even fields.

After all motion detection values for the even fields have been computed the process initiates a similar process for the odd field and, in addition, uses the already computed even field data to logically combine, on the fly, the motion detection values between the even and odd fields. Upon completion of the odd field routine, the even field memory contains all the pixels of the selected even field to be supplied to the deinterlacer, the odd field memory contains all the pixels of the selected odd field to be supplied to the deinterlacer, and the motion detection memory contains the logical sums of the even and odd motion array binary values as final motion detection values. As a result, the deinterlacer has all the necessary information to generate a deinterlaced frame.

BRIEF DESCRIPTION OF THE DRAWINGS

FIG. 2 depicts motion detection for a missing pixel located at spatial location (x,y) within a frame at time t2 using the existing co-located pixels within neighboring fields;

FIG. 3 illustrates increased reliability in motion detection by comparing a one-by-two block of pixels;

FIG. 5 diagrammatically illustrates the effect of the deinterlacing scheme described in the U.S. patent to Ishikawa, U.S. Pat No. 4,785,351;

FIG. 7 diagrammatically illustrates the manner in which a deinterlacer of a preferred embodiment of the present invention switches between vertical interpolation-and merging;

FIG. 8 diagrammatically illustrates a non-limiting example of four successive image fields E1-O1-E2-O2 of interlaced video-representative pixels that are processed to produce a motion detection map;

FIGS. 10(a)–10(c) diagrammatically show the manner in which successive lines of an even field can be stored in an N-line buffer and used to generate the values of the motion detection map stored in a motion decision storage spaced and;

FIGS. 11(a)–11(c) diagrammatically show the manner in which successive lines of an odd field can be stored in an N-line buffer and used to generate the values of the motion detection map stored in a motion decision storage space.

DETAILED DESCRIPTION

Figure 1:
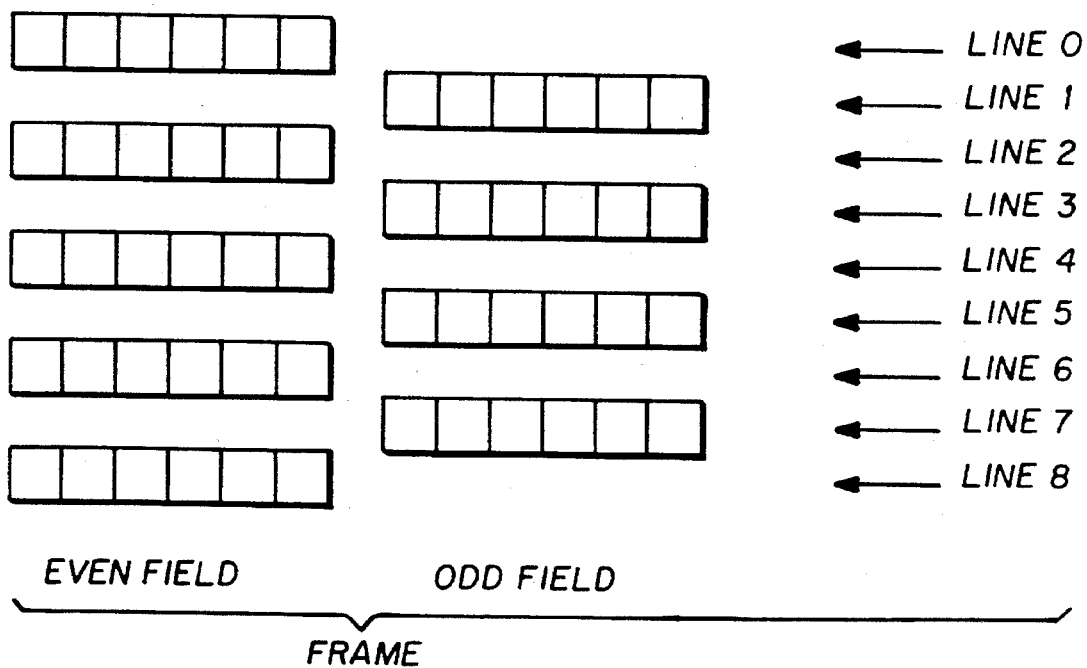
FIG. 1 diagrammatically illustrates an interlaced video frame composed of two time sequential fields—an even field and an odd field.
Figure 4:
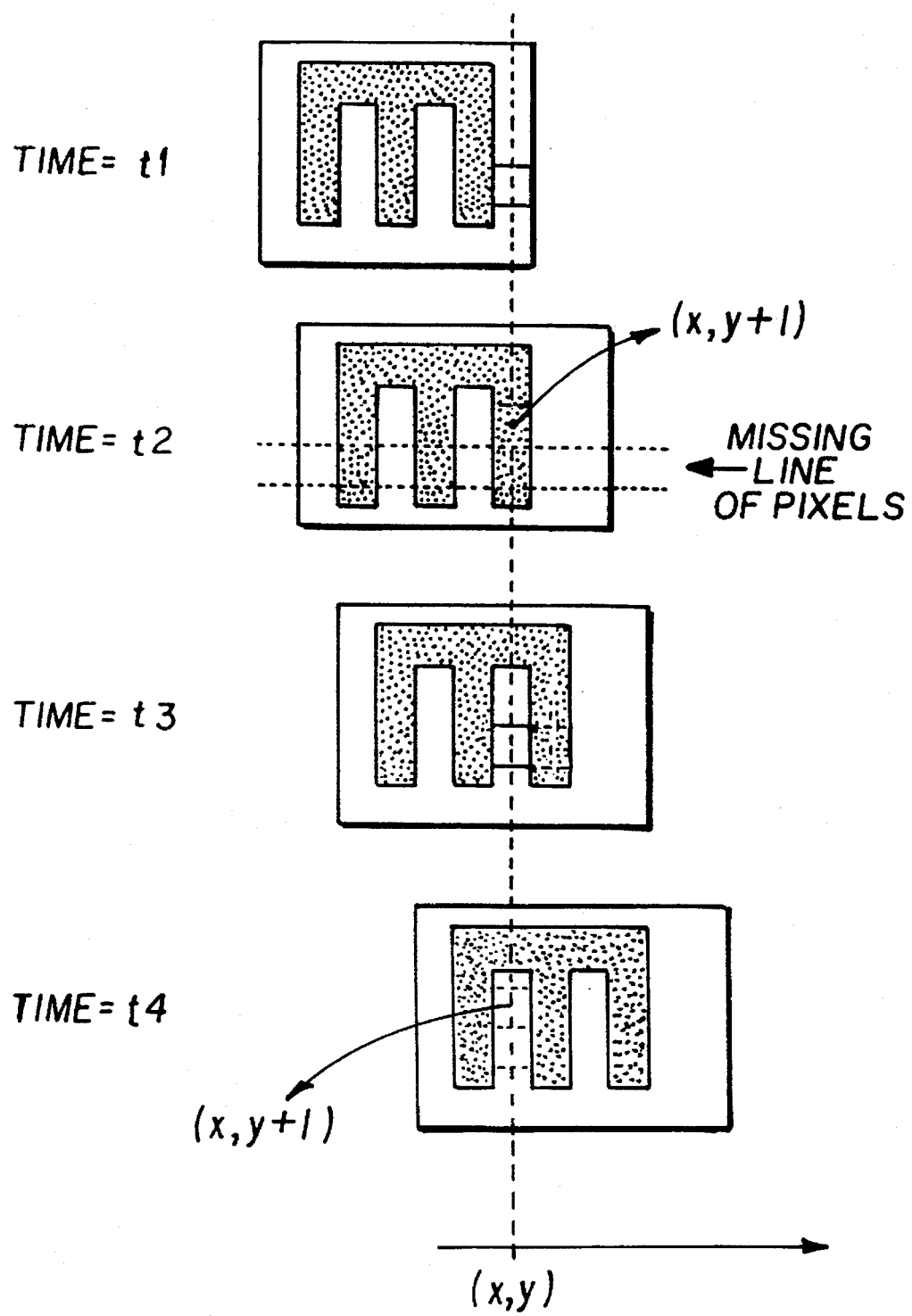
FIG. 4 illustrates the use of a fourth field for increasing the reliability of motion detection.

Before describing in detail the new and improved deinterlacing mechanism in accordance with the present invention, it should be observed that the present invention resides primarily in what is effectively a prescribed digital image processing technique that may be implemented by means of conventional digital signal processing circuitry, in particular, delay (shift register) components and arithmetic logic circuits, or may be embedded within image processing application software executable by the control processor of a digital image processing workstation, through which successive interlaced image fields of a scene are processed. The sources of such interlaced image fields may be conventional imaging hardware, such as interlaced lines of television signals derived from an NTSC system, as a non-limiting example, and are not considered part of the invention.

Consequently, the manner in which such interlaced image field sources are interfaced with either hardwired digital circuit components or a digital image processing workstation have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Figure 6:
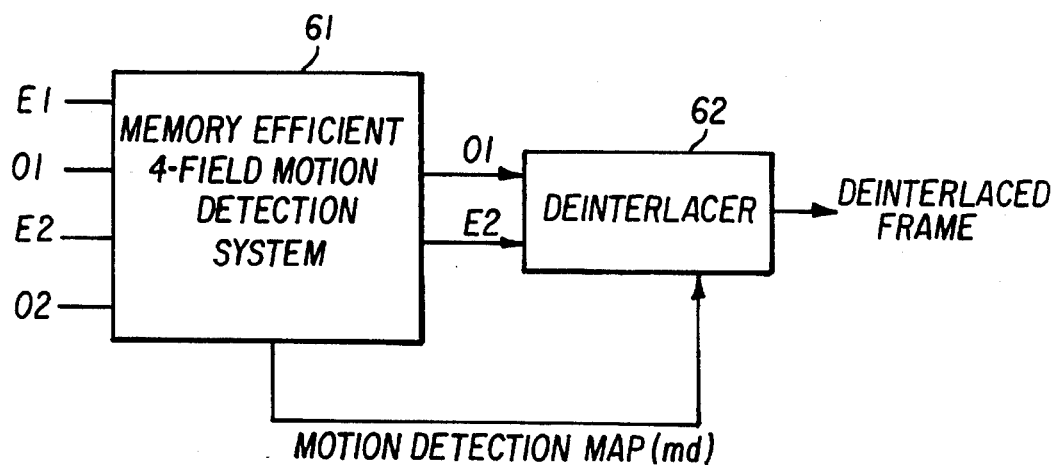
FIG. 6 diagrammatically illustrates a four field-based deinterlacing system in accordance with the present invention.

FIG. 6 diagrammatically illustrates a four field-based deinterlacing system in accordance with the present invention as comprising a front end component comprising a memory efficient four field motion detection system 61 which is coupled to receive as inputs, four successive even and odd image fields E1, O1, E2 and O2, and is operative to selectively output two of its four input fields (e.g. fields O1 and E2) and a motion detection map (md) to a downstream deinterlacer unit 62, from which the deinterlaced frame is derived.

As diagrammatically illustrated in FIG. 7, in accordance with a preferred embodiment of the present invention, the deinterlacer switches between vertical interpolation and merging, not using temporal averaging employed in the above-referenced '870 patent to Motoe et, in which the missing pixel is set to a linear combination of the result of temporal averaging of values belonging to the surrounding fields having the same polarity, and the result of vertical spatial interpolation performed using the existing pixel values of the field of interest.

In particular, motion is detected by applying a logic OR operation to the two binary motion detection signals me and mo. In the absence of motion, the pixel values of the first odd field (O1) and its immediately succeeding (second) even field (E2) are merged. Otherwise (where motion is detected), vertical interpolation is carried out for field E2, as shown by the linear combination of immediately adjacent pixels c3 and c4, respectively above and below the pixel X of interest. Generating motion detection signals using the differences computed on the basis of a block of signals will be described below with reference to FIGS. 8–11(c).

Figure 8:
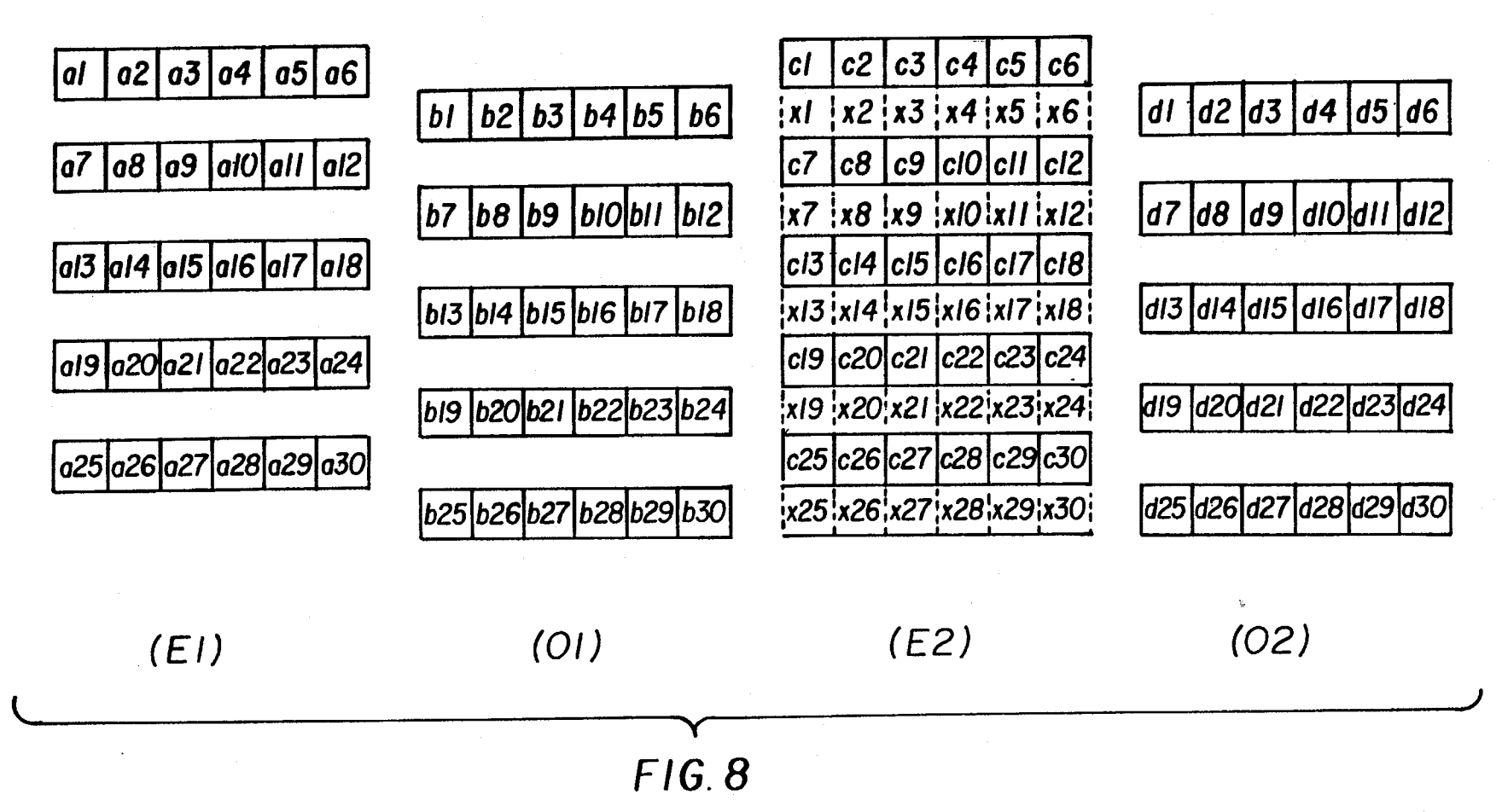

FIG. 8 diagrammatically illustrates a non-limiting example of four successive image fields E1-O1-E2-O2 of interlaced video-representative pixels that are processed to produce a motion detection map which, together with a selected two of the four consecutive fields, are employed to completely characterize the resulting deinterlaced frame. For purposes of simplification, in the present example, each of the even and odd fields is diagrammatically illustrated as an array of M1 lines by M2 pixels per line (e.g. five lines of six pixels per line, as shown), with the odd fields (O1) and (O2) being offset by one line from the even fields (E1) and (E2).

For the first field (even field E1) of the four field sequence, the available field pixels are denoted by a1, a2, . . . , a30, and for the next successive even field E2, the available pixels are denoted by c1, c2, . . . , c30. For the second image field (odd field O1) of the four field sequence, which is immediately adjacent and intermediate the even fields E1 and E2, the available pixels are denoted by b1, b2, . . . , b30. For the fourth field (odd field O2) of the four field sequence, which immediately succeeds even field E2, the available pixels are denoted by d1, d2, . . . , d30.

In the present example, the missing pixels of the missing lines of even field E2 are denoted by x1, x2, . . . , x30. The problem of deinterlacing is to estimate the missing pixel values x1, x2, . . . , x30 of even field E2 using the available pixel values of each of the four fields: E1-O1-E2-O2.

Pursuant to the invention, merging or spatial interpolation is performed to estimate the values of the missing pixels of the third field in the sequence (even field E2), with one of the factors being the presence or absence of motion in the image at the locations of the missing pixels. Motion detection is performed for each one of the missing pixels x1, x2, . . . , x30, and the result is stored as a binary value in the respective storage locations m1, m2, . . . , m30 of the M1xM2 motion detection map storage space diagrammatically illustrated at M in FIG. 9.

AS will be described, a respective one of the storage locations m1–m30 of the motion detection storage space M of FIG. 9 will contain either a "1" (if image motion is detected for the missing pixel location xi of interest), or a "0" (if there is no image motion for that missing pixel location).

Figure 9:
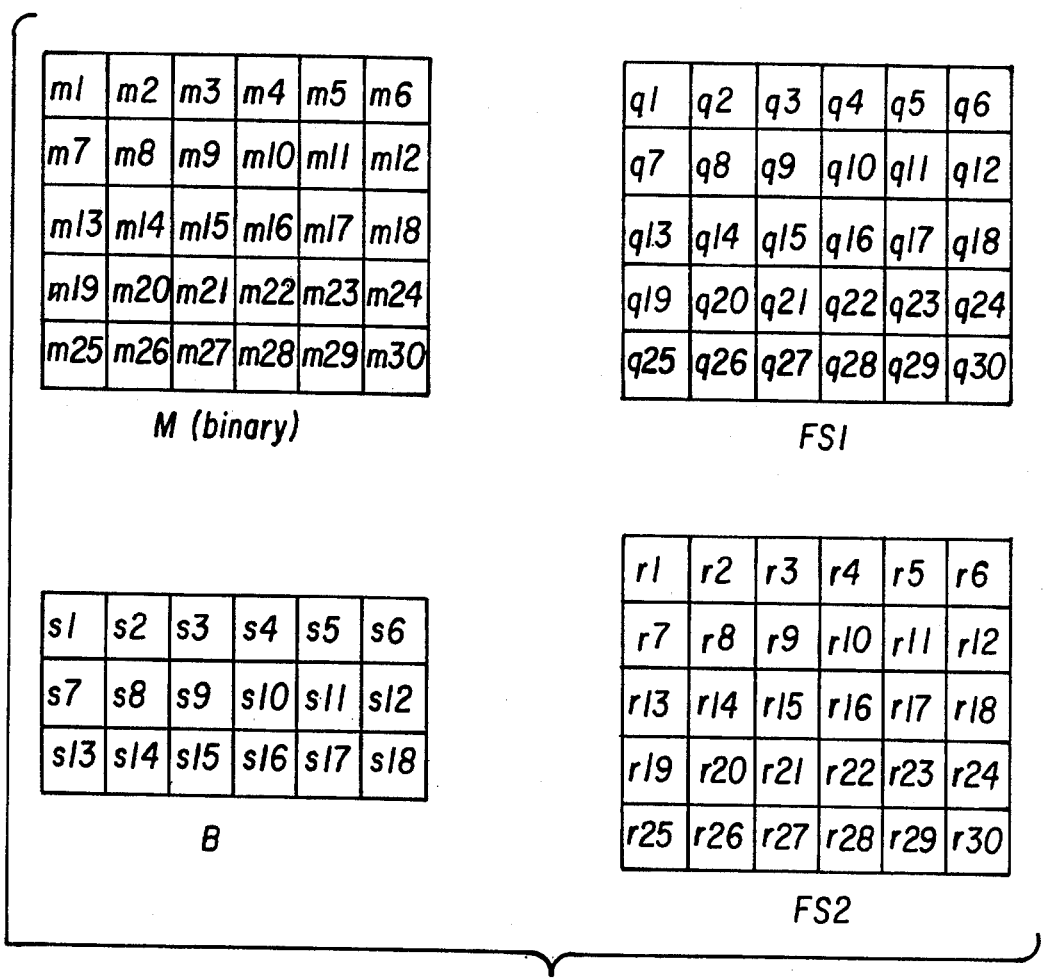
FIG. 9 diagrammatically illustrates a map storage space.

Also shown in FIG. 9 are respective field stores FS1 and FS2, to which the contents of respective image fields are written as field values q1–q30 and r1–r30. Also shown in FIG. 9 is an N-line buffer B (where N<<M1, M2). For the five line (M1), by six pixels per line (M2) example herein described, N is set to three, having storage locations s1–s18. As described above, the contents of motion detection map store M and field stores FS1 and FS2 provided by the four field motion detection system 61 are coupled to deinterlacer 62 of FIG. 6. Before describing how motion detection system 61 processes the four consecutive fields to produce the appropriate information for storage in stores FS1, FS2 and M, the operation of the deinterlacer 62 will be described.

The operation of the deinterlacer 62 to produce a respective missing pixel xi is describable by the following relationship:

$$xi = bi, \text{ if } mi = 0 \quad (1)$$
$$y, \text{ otherwise,}$$

where y is a function of neighboring existing pixel values, in general, implementing a spatial interpolation, such as directional interpolation or bilinear vertical interpolation. As will be described, in accordance with an embodiment of the invention, vertical bilinear interpolation is employed, with y being equal to the average of the existing pixel values located immediately above and below the missing pixel, e.g., for a missing pixel at location x9 in the even field (E2) of FIG. 8, i=9, and y=(½)(c9+c15).

Motion detection is performed in two steps. In the first step, the pixels of the same respective locations of the even fields E1 and E2 are compared with one another to form a first 'even' binary motion detection array Me, which, for the present example of a five line by six pixels per line field size, is comprised of binary values me1–me30, where mei=1 in the case of motion and mei=0 for the no motion case. Similarly, in a second step, the pixels of the same respective locations of the odd fields O1 and O2 are compared with one another to form a second 'odd' binary motion detection array Mo, which, for the present example, is comprised of binary values mo1–mo30, where moi=1 in the case of motion and moi=0 for the no motion case.

The first even motion detection array Me is computed by comparing the difference between N×N blocks of pixels from fields E1 and E2 with a threshold. As a non-limiting example, an N×N block may correspond to a 3×3 block of pixels. For instance, for the missing pixel location x9 within a three-by-three array E2A in the second even field E2, there is an associated array E1A for immediately preceding even field E1.

For a corresponding pixel location in each of the first (E1) and second (E2) image fields, a sum signal representative of the average of differences between values of respective ones of pixels of the arrays E1A and E2A of pixels neighboring the corresponding pixel location in each of the first and second image fields is generated. In the present example of a three-by-three summation array, this sum signal value Sum may be represented for missing pixel location x9 as:

$$Sum_{x9} = (1/9) * (|a2 - c2| + |a3 - c3| + \qquad (2)$$
$$|a4 - c4| + |a8 - c8| + |a9 - c9| + |a10 - c10| +$$
$$|a14 - c14| + |a15 - c15| + |a16 - c16|).$$

This sum signal Sum value is compared with a threshold T. If the sum signal exceeds the threshold value T, then it is concluded that there is effective relative image motion between the first and second image fields, and a "1" is written into storage location (m9=me9) of the even field storage space represented by the array M in FIG. 9. Otherwise, a "0" is written into storage location (m9=me9), indicating that there is no relative image motion at the location of missing pixel x9 of the even field E2.

$$\text{Namely, } me9 = 1, \text{ if } Sum_{x9} > T \qquad (3)$$
$$0, \text{ otherwise.}$$

Similarly, considering missing pixel location x21, its associated sum signal value $Sum_{x21}$ may be represented as:

$$Sum_{x21} = (1/9) * (|a14 - c14| + |a15 - c15| + \qquad (4)$$
$$|a16 - c16| + |a20 - c20| + |a21 - c21| + |a22 - c22| +$$
$$|a26 - c26| + |a27 - c27| + |a28 - c28|).$$

Again, the sum signal $Sum_n$ value is compared with threshold T. If the sum signal exceeds the threshold value T, then it is concluded that there is effective relative image motion between the first and second even image fields at this pixel location, and a "1" is written into storage location (me=m21) of the storage space represented by the array M in FIG. 9. Otherwise, a "0" is written into storage location (me=m21), indicating that there is no relative image motion at the location of missing pixel x21.

$$\text{Namely, } me21 = 1, \text{ if } Sum_{x21} > T \qquad (5)$$
$$0, \text{ otherwise.}$$

Where the location of the missing pixel of the second even field E2 is at a border location of the image field, the size of the array of pixels employed to perform motion detection and pixel interpolation are reduced. For the first and last row, and the first and last column, the three-by-three comparison window is appropriately downsized to a two-by-two window and to a two-by-three window, respectively.

More particularly, with reference again to FIG. 8, for missing pixel location x1 adjacent to the upper left hand border corner of the second even field image frame E2 of FIG. 8, the sum signal value $Sum_{x1}$ may be derived from a two-by-two pixel array located at the upper left hand corner of each of the even fields E1 and E2. Namely, the sum signal value associated with missing pixel x1 may be expressed as:

$$Sum_{x1}=(¼)*(|a1-c1|+|a2-c2|+|a7-c7|+|a8-c8|). \qquad (6)$$

If the sum signal value $Sum_{x1}$ exceeds the threshold value T, then it is concluded that there is effective relative image motion between the first and second image fields at missing pixel location x1, and a "1" is written into storage location me1 of the storage space associated with the even field E2 represented by the array M in FIG. 9. Otherwise, a "0" is written into storage location me1, indicating that there is no relative image motion at the location of missing pixel x1.

Similarly, for missing pixel location x2 adjacent to missing pixel x2, the sum signal value $Sum_{x2}$ may be derived from a three-by-two pixel array located at the upper left hand corner of each of the even fields E1 and E2. Namely, the sum signal value associated with missing pixel x2 may be expressed as:

$$Sum_{x2}=(⅙)*(|a1-c1|+|a2-c2|+|a3-c3|+|a7-c7|+|a8-c8|+|a9-c9|). \qquad (7)$$

Again, if the sum signal value $Sum_{x2}$ exceeds the threshold value T, then it is concluded that there is effective relative image motion between the first and second image fields at missing pixel location x2, and a "1" is written into storage location me2 of the storage space associated with the even field E2 represented by the array M in FIG. 9. Otherwise, a "0" is written into storage location me2, indicating that there is no relative image motion at the location of missing pixel x2.

In a like manner, considering missing pixels x26 and x30 at the lower portion of the even image field E2, for missing pixel location x26 adjacent to the lower left hand corner, the sum signal value $Sum_{x26}$ may be derived from an associated three-by-two pixel array located at the lower left hand corner of each of the even fields E1 and E2. Namely, the sum signal value associated with missing pixel x26 may be expressed as:

$$Sum_{x26}=(⅙)*(|a19-c19|+|a20-c20|+|a21-c21|+|a25-c25|+|a26-c26|+|a27-c27|). \qquad (8)$$

If the sum signal value $Sum_{x26}$ exceeds the threshold value T, then it is concluded that there is effective relative image motion between the first and second image fields at missing pixel location x26, and a "1" is written into storage location me26 of the storage space associated with the even field E2 represented by the array M in FIG. 9. Otherwise, a "0" is written into storage location me26, indicating that there is no relative image motion at the location of missing pixel x26.

For missing pixel location x30 at the lower right hand border corner of the second even field image frame E2 of FIG. 8, its associated sum signal value $Sum_{x30}$ may be derived from a two-by-two pixel array located at the lower right hand corner of each of the even fields E1 and E2. Thus the sum signal value $Sum_{x30}$ may be expressed as:

$$Sum_{x30}=(¼)*(|a23-c23|+|a24-c24|+|a29-c29|+|a30-c30|). \qquad (9)$$

If the sum signal value $Sum_{x30}$ exceeds the threshold value T, then it is concluded that there is effective relative image motion between the first and second image fields at missing pixel location x30, and a "1" is written into storage location me30 of the storage space associated with the even field E2 represented by the array M in FIG. 9. Otherwise, a "0" is written into storage location me30, indicating that there is no relative image motion at the location of missing pixel x30.

In addition to computing a motion detection map for even field E2, a motion detection map is computed for odd field 01, again on the basis of thresholding a block of N×N pixels. As in the previous description for the even field the N×N block may comprise a 3×3 block of pixels.

Thus, in the present example of a three-by-three summation array, for the above examples of missing pixel locations in the odd field 01, namely missing pixel locations x9, x21, x1, x2, x26 and x30, their associated sum signal values may be represented as follows:

$$Sum_{x9} = (1/9) * (|d2 - b2| + |d3 - b3| + \qquad (10)$$
$$|d4 - b4| + |d8 - b8| + |d9 - b9| + |d10 - b10| +$$
$$|d14 - b14| + |d15 - b15| + |d16 - b16|).$$

$$Sum_{x21} = (1/9) * (|d14 - b14| + |d15 - b15| + \qquad (11)$$
$$|d16 - b16| + |d20 - b20| + |d21 - b21| + |d22 - b22| +$$
$$|d26 - b26| + |d27 - b27| + |d28 - b28|).$$

$$Sum_{x1} = (1/4) * (|d1 - b1| + |d2 - b2| + \qquad (12)$$
$$|d7 - b7| + |d8 - b8|).$$

$$Sum_{x2} = (1/6) * (|d1 - b1| + |d2 - b2| + \qquad (13)$$
$$|d3 - b3| + |d7 - b7| + |d8 - b8| + |d9 - b9|).$$

$$Sum_{x26} = (1/6) * (|d19 - b19| + |d20 - b20| + \qquad (14)$$
$$|d21 - b21| + |d25 - b25| + |d26 - b26|) + |d27 - b27|).$$

$$Sum_{x30} = (1/4) * (|d23 - b23| + |d24 - b24| + \qquad (15)$$
$$|d29 - b29| + |d30 - b30|).$$

As described above for the even field, each sum signal value $Sum_{xi}$ is compared with threshold T. If the sum signal exceeds the threshold value T, then it is concluded that there is effective relative image motion between the first and second image fields, and a "1" is written into storage location (mi=moi) of the odd field storage space represented by the array M in FIG. 9. Otherwise, a "0" is written into storage location (mi=moi), indicating that there is no relative image motion at the location of missing pixel xi of the odd fields 02.

$$\text{Namely, } moi = 1, \text{ if } Sum_{xi} > T \qquad (16)$$
$$0, \text{ otherwise.}$$

As pointed out above, once the two intermediate motion detection arrays for the odd and even field pairs have been derived, a final motion detection map M is generated by logically ORing, point-by-point, the contents of the two (even and odd) motion detection arrays, i.e., each respective point mi in the final motion detection map is defined by the expression mi=(mei)V(moi), where V denotes the logical OR operation. The deinterlacer 62 of FIG. 6 then proceeds to process the odd field 01 and the even field E2 supplied motion detection system 61, as described above.

Although the foregoing method may can be carried out using a respective even and odd field motion detection storage space or device having a capacity corresponding to that of each of the fields 01, E1, 02, and E2, it is possible to reduce the amount of hardware required to perform the above process by employing a limited sized storage space for processing pixel data to determine the final motion detection map.

More particularly, what is required is a fourth or auxiliary storage space having a storage capacity of N lines of pixels, where N is less than the number of lines of the image field. This auxiliary storage space is shown as buffer B in FIG. 9. The manner in which successive lines of the even field E2 can be stored in N-line buffer B and used to generate the values of an even field motion detection map is diagrammatically shown in FIGS. 10(a)–10(c) and proceeds as follows.

In the course of processing the successive image fields ((E1-01-E2-O2) of the four field sequence of the present example, the respective pixel data values ai of the first (even) field E1 are written into storage locations qi of even field store FS1, and then the respective pixel data values bi of the second (odd) field 01 are written into storage locations ri of odd field store FS2. For the next or third field (even field E2) in the four field sequence, respective pixel values ci are sequentially written into the N-line buffer B, in the order c1, c2, c3, . . . . As the third field pixels is loaded into the auxiliary buffer B, buffer B will eventually contain a sufficient number of pixel values to permit a binary motion value to be computed from its contents and those of the first image store FS1.

More specifically, at the moment pixel value c8 of the second even field E2 is written into auxiliary buffer B, a binary value me1 can be computed for missing pixel location x1, and stored in motion detection memory M, as described above with reference to equation (6). When the next even field pixel value c9 is written into auxiliary buffer B, the second binary value me2 can be computed for missing pixel location x2 as described above with reference to equation (7), and so on, with successive binary values of motion detection memory being computed up to and including value me12 when buffer B is loaded with even pixel value c18, filling the buffer. At this time the contents of buffer B are as shown in FIG. 10(a).

Once the last pixel value c18 is loaded into the last (third) line of buffer B, further loading of buffer B cannot proceed unless accommodation is made for replacing already loaded buffer space with additional pixels of the image field. For this purpose, in accordance with the invention, the first line of pixel values c1–c6 of buffer B are transferred into the first line of even field store FS1 and written over its current values a1–a6, so that for i=(1–6), qi=ci.

With the pixel values c1–c6 in the first line of buffer B having been transferred to the first line of even field store FS1, buffer B is now loaded with additional pixel data, in particular, the next six pixel values c19–c24 of the second even field E2, as diagrammatically illustrated in FIG. 10(b). As these new pixel values are written into buffer B, the binary motion detection values me13–me18 are computed and written into motion detection memory M, using the procedure described above.

When the last pixel value c24 is loaded into the first line of buffer B, buffer B is again full. To again provide for replacing already loaded buffer space with additional pixels of the image field, the second line of pixel values c7–c12 of buffer B are transferred into the second line of even field store FS1 and written over its current values a7–a12, so that for i=(7–12), qi=ci. With the pixel values c7–c12 in the second line of buffer B having been transferred to the second line of even field store FS1, buffer B is then loaded with additional pixel data, in particular, the next six pixel values c25–c30 of the second even field E2, as shown in FIG. 10(c). As these new pixel values are written into buffer B, the binary motion detection values me19–me24 are computed and written into motion detection memory M, using the procedure described above.

When the last pixel value c30 is loaded into the second line of buffer B, buffer B is once again full. At this time, the third line of pixel values c13–c18 of buffer B are transferred into the third line of even field store FS1 and written over its current values a13–a18, so that for i=(13–18), qi=ci. In addition, since the first and second lines of buffer B contain the fourth and fifth lines of the even field, these values are now transferred to the fourth and fifth lines of even field store FS1. As a result the remaining motion detection binary values me25–me30 can be computed and written into motion detection memory M. At this point in the process, even field store FS1 contains the pixels c1–c30 of the second even field E2 (having been transferred from buffer B, as described above), odd field store FS2 contains pixels b1–b30 of odd field 01, and memory M contains motion array binary values me1–me30.

Following computation of all thirty motion detection values me1–me30 for the even fields E1 and E2, the process initiates a similar process for the odd field and, in addition, uses the already computed even field data to logically combine, on the fly, the motion detection values between the even and odd fields.

More particularly, for the final or fourth field (odd field 02) in the four field sequence, respective pixel values di are sequentially written into the N-line buffer B, in the order d1, d2, d3, . . . . As in the case of even field processing, described above, in the course of loading the fourth field (odd field 02) pixels into the auxiliary buffer B, buffer B will again eventually contain a sufficient number of pixel values to permit a binary motion value to be computed from its contents and those of the second odd field store FS2.

Namely, when pixel value d8 of the second odd field 02 is written into auxiliary buffer B, a binary value mo1 can be computed. Once this value is computed, it is logically ORed with the value of me1 previously stored in motion detection memory M and written in place of the value of me1 currently stored as motion detection value m1 in memory M. When the next pixel value d9 of odd field 02 is written into auxiliary buffer B, the second binary value mo2 is computed as described above with reference to equation (13). This value of mo2 is then logically ORed with the value of me2 previously stored in motion detection memory M and written in place of the value of this currently stored value as motion detection value m2, and so on, with successive binary values of motion detection memory being computed up to and including value m12, when buffer B is loaded with even pixel value d18, filling the buffer. At this time the contents of buffer B are as shown in FIG. 11(a).

As in the case of processing the even field E2, described above, once the last pixel value d18 of the third line of the odd field 02 has been loaded into the last (third) line of buffer B, further loading of buffer B involves replacing already loaded buffer space with additional pixels of the odd image field 02. Therefore, as described above, the first line of pixel values d1–d6 of buffer B is replaced with additional pixel data, in particular, the next six pixel values d19–d24 of the second odd field 02, as diagrammatically illustrated in FIG. 11(b). As these new pixel values are written into buffer B, the binary motion detection values mo13–mo18 are computed and logically ORed with the even field motion detection values me13–me18 currently stored in memory M. The resulting logical sums are then written into motion detection memory M, replacing the values me13–me18.

When the last pixel value d24 of the fourth line of the odd field 02 is loaded into the first line of buffer B, buffer B is again full. The buffer B is now loaded with additional pixel data, in particular, the next six pixel values c25–c30 of the second odd field 02, as shown in FIG. 11(c). As these new pixel values are written into buffer B, the binary motion detection values mo19–mo24 are computed, logically ORed with the respective motion detection values me19–me24, and the logical sums are written over the motion detection values me19–me24 in motion detection memory M.

When the last pixel value c30 is loaded into the second line of buffer B, buffer B is once again full. Since the first and second lines of buffer B contain the fourth and fifth lines of the odd field 02, the remaining motion detection binary values mo25–mo30 can be computed, logically ORed with the respective motion detection values me25–me30, and the logical sums written over the motion detection values me25–me30 in motion detection memory M.

At this point in the process, even field store FS1 contains the pixels c1–c30 of the second even field E2 (transferred from buffer B, as described above), odd field store FS2 contains pixels b1–b30 of odd field 01, and motion detection memory M contains the logical sums of the even and odd motion array binary values as values m1–m30. As a consequence, the deinterlacer 62 has all the necessary information to generate a deinterlaced frame.

In the case of fields of color video signals, the memory efficient motion detection system described above is applied to the luminance component of the signal. Consequently, if the input data is not represented by a luminance and two associated chrominance channels (YCC), it is necessary to perform a transformation to determine the luminance component (e.g. a RGB-to-YUV transform). In the deinterlace system of FIG. 6, in the preferred embodiment, merging and spatial interpolation is applied to each of the three color channels individually, according to the motion detection map.

Advantageously, currently available digital signal processing circuitry is fast enough to perform motion detection for a missing pixel location (x,y) before the next pixel (x+1,y) is acquired. A typical NTSC video digitizer digitizes a video signal to 640 pixels. NTSC signals comprising 525 lines(1/30) sec. provide 15.75 lines/msec. For 640 pixels, the pixel time is 10.08 microseconds, which is well within the cycle time of present day processors. For example, the clock cycle for a 14 MHz processor is 720 nanoseconds. The arithmetic operations to be performed for motion detection within this time interval include, at most, nine subtractions, nine comparisons (for absolute values), eight additions and a single multiplication (to form a normalized Sum). By "at most" is meant that the number of operations decreases for pixels at boundaries with decreasing window size. Also, the summation value Sum can be efficiently computed for two neighboring locations; as a three-by-three measurement window slides through the pixels, it is not necessary to recompute the differences over all nine pixels. Also, within a computation cycle for the first motion detection array me, data may be transferred from one frame store to another.

As will be appreciated from the foregoing description, the hybrid deinterlace scheme of the present invention provides an effective mechanism for selecting, on a pixel-by-pixel basis, between merging and (edge-adaptive) spatial interpolation, in accordance with relative image motion at locations of the missing pixels of a deinterlaced image frame, so that the reduced complexity advantages of using merging in steady regions of the image may be maintained, yet obviates the problem of edge-based artifacts, by employing an edge-adaptive spatial interpolation method when relative motion is detected. In order to enhance the accuracy of motion detection two consecutive fields of the same polarity are utilized for motion detection. The supposed hardware penalty of using such a multifield comparison approach is circumvented by employing one of the fields for motion detection, only, so that a reduced size buffer may be used for the purpose.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

| | PARTS LIST |
|---|---|
| 61 | Memory Efficient 4-Field Motion Detection System |
| 62 | Deinterlacer |
| FS1 | Even Field Store |
| FS2 | Odd Field Store |
| M | Motion Detection Memory |
| B | Auxiliary Buffer |

What is claimed:

1. A method of generating a digital output image comprised of successive lines of pixels from a plurality of immediately sequential first, second, third and fourth interlaced image fields having successively opposite field polarities, said plurality of interlaced image fields comprising first and third image fields of a first field polarity and second and fourth image fields of a second field polarity, interposed with said first and third image fields, said method comprising the steps of:

(a) for a respective one of the successive lines of image pixels of said third image field, generating a respective line of output image pixels of said digital output image as corresponding to said respective one of the successive lines of image pixels of said third image field;

(b) for a respective pixel location of each line of said digital output image for which there is no line of image pixels in said third image field, selectively generating a missing image pixel as either a pixel located at the same pixel location in said second image field, or generating said missing image pixel as a function of one or more pixels in said third image field, in dependence whether a prescribed combination of said first, second, third and fourth image fields reveals motion at said respective pixel location;

(b1) for said respective pixel location of said each line of said digital output image, identifying a corresponding pixel location in each of said first and third image fields;

(b2) for the corresponding pixel location in each of said first and third image fields, generating a sum signal representative of the average of differences between values of respective ones of pixels of the plurality Of pixels neighboring said corresponding pixel location in each of said first and third image fields;

(b3) generating a first signal representative of the occurrence or non-occurrence of motion at said respective pixel location in the image represented by said first and third image fields in accordance with a prescribed relationship between said sum signal and a threshold value;

(b4) for said respective pixel location of said each line of said digital output image, identifying a corresponding pixel location in each of said second and fourth image fields;

(b5) for the corresponding pixel location in each of said second and fourth image fields, generating a sum signal representative of the average of differences between values of respective ones of pixels of the plurality of pixels neighboring said corresponding pixel location in each of said second and fourth image fields;

(b6) generating a second Signal representative of the occurrence or non-occurrence of motion at said respective pixel location in the image represented by said second and fourth image fields in accordance with a prescribed relationship between said sum signal and said threshold value;

(b7) selectively generating said missing image pixel as either a pixel located at the same pixel location in said second image field, or generating said missing image pixel as a function of one or more pixels in said third image field, in accordance with a combination of said first and second signals;

(b7i) a method selectively generating said missing image pixel as a function of one or more pixels in said third image field in accordance with a prescribed logical combination of said first and second signals; and (b7ii) a method selectively generating said missing image pixel as a function of one or more pixels in said third image field in accordance with a logical ORing of said first and second signals.

2. A method according to claim 1, wherein step (b) comprises selectively generating said missing image pixel in said third image field as a pixel located at the same pixel location in said second image field in dependence upon a lack of image motion at said respective pixel location.

3. A method according to claim 1, wherein step (b) comprises generating said missing image pixel as a function of one or more pixels in said third image field, in dependence upon the occurrence of image motion at said respective pixel location.

4. A method according to claim 3, wherein step (b) comprises generating said missing image pixel as a function of a plurality of pixels in said third image field, in dependence upon the occurrence of image motion at said respective pixel location.

5. A method according to claim 3, wherein step (b) comprises generating said missing image pixel as vertical spatial interpolation of pixels in said third image field adjacent to said missing image pixel.

6. A method according to claim 3, wherein step (b) comprises generating said missing image pixel as a linear function of pixels in a plurality of lines in said third image field, in dependence upon the occurrence of image motion at said respective pixel location.

7. A method according to claim 6, wherein said plurality of lines in said third image field correspond to lines immediately adjacent to said each line of said digital output image.

8. A method of generating a digital output image comprised of successive lines of pixels from a plurality of immediately sequential first, second, third and fourth interlaced image fields having successively opposite field polarities, said plurality of interlaced image fields comprising first and third image fields of a first field polarity and second and fourth image fields of a second field polarity, interposed with said first and third image fields, said method comprising the steps of:

(a) for the pixels of said digital output image, generating a motion detection map the contents of which are representative of whether motion exists at said pixels of said digital output image in dependence upon the image contents of said first, second, third and fourth image fields;

(a1) for a respective pixel location of said each line of said digital output image, identifying a corresponding pixel location in each of said first and third image fields;

(a2) for the corresponding pixel location in each of said first and third image fields, generating a sum signal representative of the average of differences between values of respective ones of pixels of the plurality of pixels neighboring said corresponding pixel location in each of said first and third image fields;

(a3) generating a first signal representative of the occurrence or non-occurrence of motion at said respective pixel location in the image represented by said first and third image fields in accordance with a prescribed relationship between said sum signal and a threshold value;

(a4) for said respective pixel location of said each line of Said digital output image, identifying a corresponding pixel location in each of said second and fourth image fields;

(a5) for the corresponding pixel location in each of said second and fourth image fields, generating a sum signal representative of the average of differences between values of respective ones of pixels of the plurality of pixels neighboring said corresponding pixel location in each of said second and fourth image fields;

(a6) generating a second signal representative of the occurrence or non-occurrence of motion at said respective pixel location in the image represented by said second and fourth image fields in accordance with a prescribed relationship between said sum signal and said threshold value;

(a7) generating a motion value indicative of the presence or absence of motion at said respective pixel in accordance with a combination of said first and second signals;

wherein step (a7) further comprises generating said motion value indicative of the presence or absence of motion at said respective pixel in accordance with a prescribed logical combination of said first and second signals; and generating said motion value indicative of the presence or absence of motion at said respective pixel in accordance with a logical ORing of said first and second signals; and (b) selectively generating missing image pixels of said digital output image in accordance with the contents of said second and third image fields based upon the contents of said motion detection map.

9. A method according to claim 8, wherein step (b) comprises selectively generating missing image pixels of said digital output image as either pixels in said second image field, or as a function of one or more pixels in said third image field, in dependence upon the contents of said motion detection map.

10. A method according to claim 9, wherein step (b) includes for a respective one of the successive lines of image pixels of said third image field, generating a respective line of output image pixels of said digital output image as corresponding to said respective one of the successive lines of image pixels of said third image field, and for a pixel location of each line of said digital output image for which there is no line of image pixels in said third image field, selectively generating a missing image pixel as either a pixel located at the same pixel location in said second image field, or generating said missing image pixel as a function of one or more pixels in said third image field, in dependence whether said motion detection map reveals motion at said respective pixel location.

11. A method according to claim 8, wherein step (b) comprises selectively generating said missing image pixel in said third image field as a pixel located at the same pixel location in said second image field in dependence said motion detection map indicating a lack of image motion at said respective pixel location.

12. A method according to claim 8, wherein step (b) comprises generating said missing image pixel as a function of one or more pixels in said third image field, in dependence upon said motion detection map indicating the occurrence of image motion at said respective pixel location.

13. A method according to claim 12, wherein step (b) comprises generating said missing image pixel as a function of a plurality of pixels in said third image field, in dependence upon said motion detection map indicating the occurrence of image motion at said respective pixel location.

14. A method according to claim 12, wherein step (b) comprises generating said missing image pixel as vertical spatial interpolation of pixels in said third image field adjacent to said missing image pixel.

15. A method according to claim 12, wherein step (b) comprises generating said missing image pixel as a linear function of pixels in a plurality of lines in said third image field, in dependence upon said motion detection map indicating the occurrence of image motion at said respective pixel location.

16. A method according to claim 15, wherein said plurality of lines in said third image field correspond to lines immediately adjacent to said each line of said digital output image.

17. A method of generating a digital output image comprised of successive lines of pixels from a plurality of immediately sequential first, second, third and fourth interlaced image fields having successively opposite field polarities, said plurality of interlaced image fields comprising first and third image fields of a first field polarity and second and fourth image fields of a second field polarity, interposed between said first and third image fields, said method comprising the steps of:

(a) storing pixel value signals representative of pixels of first image field in a first storage space;

(b) storing pixel value signals representative of pixels of said second image field in a second storage space;

(c) sequentially writing plural lines of pixel values of said third image field into storage locations of a third storage space having a plurality of storage locations sufficient to accommodate the storage of pixel values of pixels within a plurality of lines, the number of which is less than the total number of lines of said third image field;

(d) providing a fourth storage space having a storage capacity sufficient to accommodate the number of missing pixels of said digital output image;

(e) for a respective pixel location of each line of said digital output image for which there is no image pixel in said third image field, generating a first motion signal representative of the occurrence or non-occurrence of motion at said respective pixel location in the image in dependence upon the image contents of said first image field stored in said first storage space and those lines of said third image field stored in said third storage space, and storing said first motion signal representative of the occurrence or non-occurrence of motion in a respective storage location of said fourth storage space associated with said respective pixel of said digital output image;

(f) sequentially writing plural lines of pixel values of said fourth image field into storage locations of said third storage space;

(g) for a respective pixel location of each line of said digital output image for which there is no image pixel in said third image field, generating a second motion signal representative of the occurrence or non-occurrence of motion at said respective pixel location in the image in dependence upon the image contents of said second image field stored in said second storage space and those lines of said fourth image field stored in said third storage space, combining said second motion signal with said first motion signal, and storing a third motion signal representative of the occurrence or non-occurrence of motion in said respective storage location of said fourth storage space associated with said respective pixel of said digital output image; and (h) selectively generating said missing image pixel as either a pixel located at the same pixel location in one of said second and third image fields, or generating said missing image pixel as a function of one or more pixels in said third image field, in accordance with said signal generated and stored in step (g).

18. A method according to claim 17, wherein step (e) comprises:

(e1) for a respective pixel location of each line of said digital output image for which there is no image pixel in said third image field, identifying a corresponding pixel location in each of said first and third image fields;

(e2) for the corresponding pixel location in each of said first and third image fields, generating a first sum signal representative of the average of differences between values of respective ones of pixels of the plurality of pixels neighboring said corresponding pixel location in each of said first and third image fields;

(e3) generating said first motion signal representative of the occurrence or non-occurrence of motion at said respective pixel location in the image represented by said first and third image fields in accordance with a prescribed relationship between said first sum signal and a threshold value; and (e4) storing the signal generated in step (e3) in a respective storage location of said fourth storage device associated with said respective pixel of said digital output image.

19. A method according to claim 18, wherein step (g) comprises:

(g1) for a respective pixel location of each line of said digital output image for which there is no image pixel in said third image field, identifying a corresponding pixel location in each of said second and fourth image fields;

(g2) for the corresponding pixel location in each of said second and fourth image fields, generating a second sum signal representative of the average of differences between values of respective ones of pixels of the plurality of pixels neighboring said corresponding pixel location in each of said second and fourth image fields;

(g3) generating said second motion signal representative of the occurrence or non-occurrence of motion at said respective pixel location in the image represented by said second and fourth image fields in accordance with a prescribed relationship between said second sum signal and said threshold value;

(g4) combining said second motion signal with said first motion signal, and storing said third motion signal representative of the occurrence or non-occurrence of motion in said respective storage location of said fourth storage space associated with said respective pixel of said digital output image; and (g5) storing said third motion signal in a respective storage location of said fourth storage device associated with said respective pixel of said digital output image.

20. An apparatus for generating a digital output image comprised of successive lines of pixels from a plurality of immediately sequential first, second, third and fourth interlaced image fields having successively opposite field polarities, said plurality of interlaced image fields comprising first and third image fields of a first field polarity and second and fourth image fields of a second field polarity, interposed with said first and third image fields, said apparatus comprising:

an image motion detection unit which is coupled to receive said first through fourth image fields and is operative to selectively output two of its four input fields and a motion detection map, contents of said motion detection being representative of whether motion exists at pixels of said digital output image in dependence upon the image contents of said first, second, third and fourth image fields;

a deinterlacer which is operative to selectively generate missing image pixels of said digital output image in accordance with the contents of said second and third image fields based upon the contents of said motion detection map;

wherein said image motion detection unit is operative to perform the following sequence of steps:

(i) for a respective pixel location of said each line of said digital output image, identifying corresponding pixel location in each of said first and third image fields;

(ii) for the corresponding pixel location in each of said first and third image fields, generating a sum signal representative of the average of differences between values of respective ones of pixels of the plurality of pixels neighboring said corresponding pixel location in each of said first and third image fields;

(iii) generating a first signal representative of the occurrence or non-occurrence of motion at said respective pixel location in the image represented by said first and third image fields in accordance with a prescribed relationship between said sum signal and a threshold value;

(iv) for said respective pixel location of said each line of said digital output image, identifying a corresponding pixel location in each of said second and fourth image fields;

(v) for the corresponding pixel location in each of said second and fourth image fields, generating a sum signal representative of the average of differences between values of respective ones of pixels of the plurality of pixels neighboring said corresponding pixel location in each of said second and fourth image fields;

(vi) generating a second signal representative of the occurrence or non-occurrence of motion at said respective pixel location in the image represented by said second and fourth image fields in accordance with a prescribed relationship between said sum signal and said threshold value; and (vii) generating a motion value indicative of the presence or absence of motion at said respective pixel in accordance with a combination of said first and second signals;

wherein said image motion detection unit is operative to generate said motion value indicative of the presence or absence of motion at said respective pixel in accordance with a prescribed logical combination of said first and second signals; and wherein said image motion detection unit is operative to generate said motion value indicative of the presence or absence of motion at said respective pixel in accordance with a logical ORing of said first and second signals.

21. An apparatus according to claim 20, wherein said deinterlacer is operative to selectively generating missing image pixels of said digital output image as either pixels in said second image field, or as a function of one or more pixels in said third image field, in dependence upon the contents of said motion detection map.

22. An apparatus according to claim 21, wherein said deinterlacer is operative to generate a respective line of output image pixels of said digital output image, for a respective one of the successive lines of image pixels of said third image field, corresponding to said respective one of the successive lines of image pixels of said third image field and, for a pixel location of each line of said digital output image for which there is no line of image pixels in said third image field, to selectively generate a missing image pixel as either a pixel located at the same pixel location in said second image field, or generate said missing image pixel as a function of one or more pixels in said third image field, in dependence whether said motion detection map reveals motion at said respective pixel location.

23. An apparatus according to claim 20, wherein said deinterlacer is operative to selectively generate said missing image pixel in said third image field as a pixel located at the same pixel location in said second image field in dependence said motion detection map indicating a lack of image motion at said respective pixel location.

24. An apparatus according to claim 20, wherein said deinterlacer is operative to generate said missing image pixel as a function of one or more pixels in said third image field, in dependence upon said motion detection map indicating the occurrence of image motion at said respective pixel location.

25. An apparatus according to claim 24, wherein said deinterlacer is operative to generate said missing image pixel as a function of a plurality of pixels in said third image field, in dependence upon said motion detection map indicating the occurrence of image motion at said respective pixel location.

26. An apparatus according to claim 24, wherein said deinterlacer is operative to generate said missing image pixel as vertical spatial interpolation of pixels in said third image field adjacent to said missing image pixel.

27. An apparatus according to claim 24, wherein said deinterlacer is operative generate said missing image pixel as a linear function of pixels in a plurality of lines in said third image field, in dependence upon said motion detection map indicating the occurrence of image motion at said respective pixel location.

28. An apparatus according to claim 27, wherein said plurality of lines in said third image field correspond to lines immediately adjacent to said each line of said digital output image.

29. An apparatus for generating a digital output image comprised of successive lines of pixels from a plurality of immediately sequential first, second, third and fourth interlaced image fields having successively opposite field polarities, said plurality of interlaced image fields comprising first and third image fields of a first field polarity and second and fourth image fields of a second field polarity, interposed between said first and third image fields, said apparatus comprising:

a first storage space which stores pixel value signals representative of pixels of first image field;

a second storage space which stores pixel value signals representative of pixels of said second image field;

a third storage space having a plurality of storage locations sufficient to accommodate the storage of pixel values of pixels within a plurality of lines, the number of which is less than the total number of lines of said third image field, said plurality of storage locations of said third storage space sequentially storing plural lines of pixel values of said third image field;

a fourth storage space having a storage capacity sufficient to accommodate the number of missing pixels of said digital output image; and a motion detection unit which is operative to perform the following steps:

(i) for a respective pixel location of each line of said digital output image for which there is no image pixel in said third image field, generating a first motion signal representative of the occurrence or non-occurrence of motion at said respective pixel location in the image in dependence upon the image contents of said first image field stored in said first storage space and those lines of said third image field stored in said third storage space, and storing said first motion signal representative of the occurrence or non-occurrence of motion in a respective storage location of said fourth storage space associated with said respective pixel of said digital output image;

(ii) sequentially writing plural lines of pixel values of said fourth image field into storage locations of said third storage space;

(iii) for a respective pixel location of each line of said digital output image for which there is no image pixel in said third image field, generating a second motion signal representative of the occurrence or non-occurrence of motion at said respective pixel location in the image in dependence upon the image contents of said second image field stored in said second storage space and those lines of said fourth image field stored in said third storage space, combining said second motion signal with said first motion signal, and storing a third motion signal representative of the occurrence or non-occurrence of motion in said respective storage location of said fourth storage space associated with said respective pixel of said digital output image; and (iv) selectively generating said missing image pixel as either a pixel located at the same pixel location in one of said second and third image fields, or generating said missing image pixel as a function of one or more pixels in said third image field, in accordance with said signal generated and stored in step (iii).

30. An apparatus according to claim 29, wherein step (i) comprises:

(i-1) for a respective pixel location of each line of said digital output image for which there is no image pixel in said third image field, identifying a corresponding pixel location in each of said first and third image fields;

(i-2) for the corresponding pixel location in each of said first and third image fields, generating a first sum signal representative of the average of differences between values of respective ones of pixels of the plurality of pixels neighboring said corresponding pixel location in each of said first and third image fields;

(i-3) generating said first motion signal representative of the occurrence or non-occurrence of motion at said respective pixel location in the image represented by said first and third image fields in accordance with a prescribed relationship between said first sum signal and a threshold value; and (i-4) storing the signal generated in step (i3) in a respective storage location of said fourth storage device associated with said respective pixel of said digital output image.

31. An apparatus according to claim 30, wherein (iii) comprises:

(iii-1) for a respective pixel location of each line of said digital output image for which there is no image pixel in said third image field, identifying a corresponding pixel location in each of said second and fourth image fields;

(iii-2) for the corresponding pixel location in each of said second and fourth image fields, generating a second sum signal representative of the average of differences between values of respective ones of pixels of the plurality of pixels neighboring said corresponding pixel location in each of said second and fourth image fields;

(iii-3) generating said second motion signal representative of the occurrence or non-occurrence of motion at said respective pixel location in the image represented by said second and fourth image fields in accordance with a prescribed relationship between said second sum signal and said threshold value;

(iii-4) combining said second motion signal with said first motion signal, and storing said third motion signal representative of the occurrence or non-occurrence of motion in said respective storage location of said fourth storage space associated with said respective pixel of said digital output image; and (iii-5) storing said third motion signal in a respective storage location of said fourth storage device associated with said respective pixel of said digital output image.

* * * * *